Jan. 17, 1950   C. E. PERRINE ET AL   2,495,129
WELDING EQUIPMENT
Filed April 17, 1948

INVENTOR.
CLARENCE E. PERRINE
AND
BY ARCHIBALD M. BROWN

ATTORNEYS

Patented Jan. 17, 1950

2,495,129

UNITED STATES PATENT OFFICE 2,495,129

WELDING EQUIPMENT

Clarence Earl Perrine and Archibald Murray Brown, Akron, Ohio, assignors to The Firestone Tire & Rubber Company, Akron, Ohio, a corporation of Ohio Application April 17, 1948, Serial No. 21,724

3 Claims. (Cl. 113—111)

This invention relates to equipment for welding, and in particular to equipment of the type shown in Patent No. 2,254,792 to Brown wherein means is provided for introducing a burner for a reducing gas into the interior of a substantially closed receptacle, such as a steel barrel, and maintaining the burner in juxtaposition to a welding means outwardly of the receptacle while the latter is rotated.

In the construction disclosed in said patent the burner is counterweighted and suspended on the gas line through a ball-and-socket connection which permits more or less universal movement. Such construction resulted frequently in oscillations of the burner of considerable period, amplitude and duration. Consequently, the burning gas was applied only intermittently at the welding point with consequent inefficiency, bad welds and deleterious effects on the metal in the region of the weld.

It has also been found that in the construction disclosed in the above-referred-to patent, the supply-line connection of the gas lead-in to the burner was found to leak and ignite, probably due in large part to the eccentric loading, which leakage not only wasted gas but also frequently ignited and aggravated the situation by damaging the bearing.

It is therefore an object of this invention to provide welding equipment of this type in which the above-noted defects are obviated.

It is a further object to provide welding equipment having a rotatable gas-supply line in which leakage and oscillation are minimized.

More particularly, it is an object of this invention to provide a gas-supply line for welding of the type having one component counterweighted and another relatively rotatable in which the bearing surfaces are external of the counterweighted member and the gas supply to the latter is independent of bearing surfaces.

Briefly, the invention consists in provision of a bearing in the gas supply tube and a connection to the counterweighted burner which has only a limited rotation feature to permit insertion through the bung of a barrel, and the provision of a tube directly from the supply tube to the burner.

For a more complete understanding of the invention, reference is had to the accompanying specification and to the drawings, in which Fig. 1 is a transverse sectional view through a barrel showing the welding head, the burner and the supply line at an angle to the burner;

Figure 1:
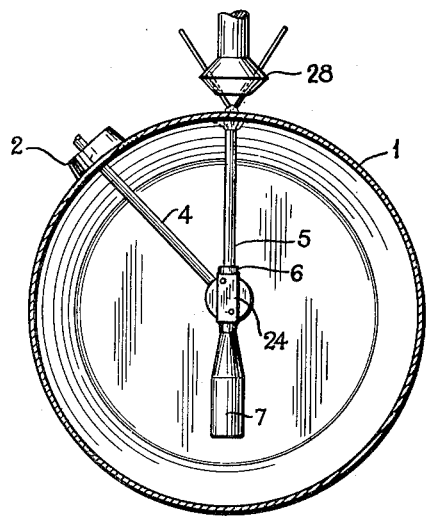
Figure 2:
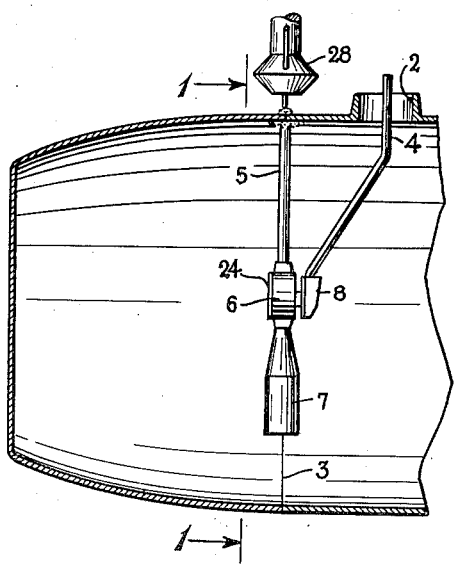
Fig. 2 is a longitudinal section through a barrel showing the supply line aligned with the burner.
Figure 3:
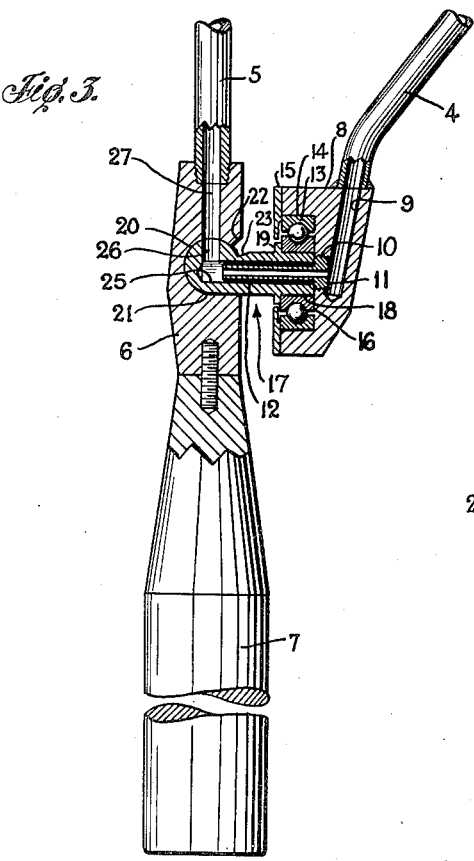
Fig. 3 is an enlarged fragmentary view of the burner and supply line showing parts in section.

Referring now to Figs. 1 and 2, there is shown a barrel 1 having a bung hole 2. The barrel is in three sections, only two of which are shown. These sections are shown placed in abutting relation along the line 3 for the welding operation.

A supply line for a reducing gas such as nitrogen, hydrogen or other non-oxidizing or inert gas is shown at 4 extending through the bung hole. A burner 5 is threadedly carried by a fixture 6 carrying a dependent weight member 7.

The supply line 4 is connected to the assemblage 5, 6, 7, for revolution about a transverse line through the member 6, as follows:

Attached to the bottom of the supply line 4, as by welding, is a gas-transfer member 8 having a bore 9 in continuation of the supply line. A tapered, threaded bore 10 intersects the bore 9 and receives a nipple 11 having an extended tubular shank 12 which serves to carry the gas to the member 6 without exposing it to any relatively moving parts. An outer bearing race 13 is received in a counterbore 14 and retained therein by a screw-held retainer 15. All of the parts 8 through 15 rotate in unison about an inner race 16 which carries as by a force-fit or shrink-fit, or otherwise, a connecting member 17.

Figure 4:
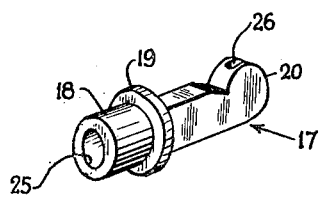
Fig. 4 is a perspective of a detail.

Element 17, which is shown in detail in Fig. 4, has a shank 18 of circular section, flanged as at 19, the balance being of rectangular section in transverse planes and having a domed end portion 20 circular in side section for about 270 degrees of arc. A longitudinal bore 25 communicates with a vertical bore 26 in the rounded portion, the bore 26 being aligned with a bore 27 in the member 6.

The member 6 has a side opening receiving the rounded portion 20 for rotation which is limited by a lower flat surface 21 and an upper bevel 22, the latter abutting against a slant surface 23 on the member 17 in folded position of the assemblage. A cover plate 24 holds the domed element 20 in place in the member 6.

For insertion through the bung hole the burner assemblage is revolved about the rounded member 20 into close proximity with the supply line 4. After insertion into the barrel the burner assumes its vertical position under the barrel seam through action of the counterweight 7. In the righting of the burner the flat surface comes into contact with the member 17 and oscillation ceases. Thereafter, any tendency of the burner to swing toward the supply line is abruptly damped, and oscillation, if it is initiated, is limited to one-half of a cycle. Of course there is no oscillation possible, in the plane of the seam, of the burner relative to the element 20 and the provision of the rotative features apart from the burner permits the use of anti-friction devices whereby no forces are imparted to the burner which would cause it to swing.

In operation the line 4 rotates with the barrel, through mechanism described in the above-mentioned patent, while the burner remains in position under the seam and cooperates continuously with a stationary welding head 28.

It will be evident from the foregoing description that the invention achieves the afore-stated objects in that the principal bearing surface has been removed from the burner component and located entirely apart from the gas line, and that, further, the transfer line from the supply to the burner is also divorced from rotative surfaces and achieves a satisfactory flow without the risk of leaks. The extended shank, 12, being slightly spaced from the bore 25 presents an additional feature in that it acts as an aspirator to recapture any minute quantities of gas which might possibly divert from the main channel, although such possibility is remote in the mechanism shown.

The embodiment shown, which is in the best form now known to us, is for illustrative purposes and the invention should not be construed as limited except as shall appear from the spirit and scope of the appended claims.

What is claimed is:

1. Gas transfer equipment adapted for use interiorly of a cylindrical and rotatably mounted work piece, said apparatus including an elongate supporting and gas inlet element adapted to be extended through and to rotate with said work piece, a gas outlet member, and means for the support of said gas outlet member by said supporting element to permit rotational movement in respect thereto, said outlet member including a counter-weight portion and a tubular outlet portion spaced from said counter-weight portion, said outlet member being supported at a position, in respect to said counter-weight and said tubular portions, to insure gravity positioning of said tubular portion during rotation of said supporting element with said work piece, said support means comprising an elongate element apertured to permit fluid conduction therethrough and provided at one end thereof with a cylindrical bearing portion and at the opposite end thereof with a bearing portion arcuate in cross section about an axis normal to the axis of said elongate element, said supporting element being provided with bearing means for the journaled reception of said cylindrical portion of said elongate element, said outlet element being provided with bearing means for engagement with said arcuate portion of said connecting element, whereby said elongate element is permitted rotational movement in respect to said supporting element, and said outlet element is permitted relative movement about an axis normal to the axis of rotation of said elongate element.

2. In a device of the character described, a support member provided with a chamber for the reception of a bearing, a bearing disposed within said chamber, an elongate member provided with a center bore, one end of said member defining a cylindrical bearing surface receivable within said bearing, said elongate member being provided at the opposite end thereof with a semi-cylindrical bearing surface, the axis of which is normal to the axis of said center bore, said bearing portion having an aperture providing communication from said center bore to said bearing surface, an outlet member including a conduit portion leading to said aperture and a counter-weight portion mounted to depend from said elongate member for the gravity positioning of said outlet portion to permit fluid transfer between the center bore of said elongate member and the conduit portion of said outlet member, said support member being apertured for the introduction of fluid to the center bore of said elongate member for delivery to said outlet member.

3. As an article of manufacture, an elongate flat-sided connecting member including at one end thereof a cylindrical bearing portion, the opposite end portion thereof presenting an only semi-cylindrical bearing surface in right angular relation to said first-mentioned bearing surface, the sides of said latter bearing portion being flat and coplanar with the flat sides of said member said member being center bored from the first-mentioned end thereof to a position short of the opposite end thereof, and said semi-cylindrical bearing portion being radially bored in non-aligned relation directly through to said center bore to provide a path for fluid communication from the center of said first-mentioned bearing portion to a point on the surface of said second-mentioned bearing portion, the center bore of the member being coaxial with the cylindrical bearing portion.

CLARENCE EARL PERRINE.
ARCHIBALD MURRAY BROWN.

REFERENCES CITED

The following references are of record in the file of this patent:

UNITED STATES PATENTS

| Number | Name | Date |
|---|---|---|
| 2,091,307 | Catlett | Aug. 31, 1937 |
| 2,254,792 | Brown | Sept. 2, 1941 |
| 2,312,341 | King | Mar. 2, 1943 |